US009646195B1

(12) United States Patent
Kim et al.

(10) Patent No.: US 9,646,195 B1
(45) Date of Patent: May 9, 2017

(54) FACIAL FEATURE LIQUIFYING USING FACE MESH

(71) Applicant: Adobe Systems Incorporated, San Jose, CA (US)

(72) Inventors: Byungmoon Kim, Sunnyvale, CA (US); Daichi Ito, Los Gatos, CA (US); Gahye Park, Santa Clara, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/938,673

(22) Filed: Nov. 11, 2015

(51) Int. Cl.
*G06K 9/00* (2006.01)

(52) U.S. Cl.
CPC ..... *G06K 9/00228* (2013.01); *G06K 9/00281* (2013.01); *G06K 9/00288* (2013.01)

(58) Field of Classification Search
USPC ............. 382/118, 131; 340/5.83, 539.1, 575; 345/420
See application file for complete search history.

(56) References Cited

U.S. PATENT DOCUMENTS 8,040,247 B2 * 10/2011 Gunaratne ............... A61B 5/18 340/5.83
9,498,645 B2 * 11/2016 Bzdusek ................. G06T 7/003

* cited by examiner

*Primary Examiner* — Anh Do
(74) *Attorney, Agent, or Firm* — Wolfe-SBMC

(57) ABSTRACT

In embodiments of facial feature liquifying using face mesh, an image processing application is implemented to modify facial features of a face in an image using an updated face mesh generated from a combination of deformation fields. The image processing application can generate a face mesh that includes landmark points, and then construct the deformation fields on the face mesh, where the deformation fields are defined by warpable elements formed from the landmark points. The image processing application can also combine the deformation fields and generate the updated face mesh that includes the combined deformation fields. The image processing application can also display the updated face mesh and receive an input to initiate modifying one or more of the facial features of the face in the image using the combined deformation fields included in the updated face mesh.

20 Claims, 7 Drawing Sheets

FACIAL FEATURE LIQUIFYING USING FACE MESH

BACKGROUND

Modifying digital images using a computer often includes changing the appearance of facial features. For instance, the eyes of a person in an image can be enlarged by selecting an area near one of the eyes and warping (e.g., twisting and/or stretching) the selected area radially outward. This technique, however, can unintentionally distort all of the facial features surrounding the selected area, resulting in an image with some visible facial distortion. Conventional techniques enable users to generally make the eyes of a person in an image bigger, but doing so may cause the overall quality and appearance of the face to diminish. For example, areas around the enlarged eyes may appear disjointed thereby causing the image to appear unrealistic. Thus, using conventional techniques to modify facial features in a digital image can result in user dissatisfaction.

Further, conventional systems that are available to modify facial features can be cumbersome to some users and/or can have limited functionality. For instance, using conventional systems, users are required to operate multiple controls to achieve a desired modification. That is, in an eye enlargement example, additional inputs directed to specific areas around the enlarged eyes are required to compensate for the abnormality caused by the initial input. Accordingly, conventional systems require iterative inputs from the user to change multiple portions of the face, often with one input causing distortion that requires yet another input, which is cumbersome to some users. Additionally, due to memory and/or processor limitations of these conventional systems, providing changes in appearance to selected features in a realistic manner cannot be achieved in real-time.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

Facial feature liquifying using face mesh is described. In embodiments, an image processing application can be implemented to modify facial features of a face in an image using an updated face mesh generated from a combination of deformation fields. The image processing application can first generate a face mesh that includes landmark points, and then construct the deformation fields on the face mesh, where the deformation fields are defined by warpable elements formed from the landmark points. The image processing application can also combine the deformation fields and generate the updated face mesh that includes the combined deformation fields. The image processing application can also initiate a display of the updated face mesh and receive an input to initiate modifying one or more of the facial features of the face in the image using the combined deformation fields included in the updated face mesh.

In embodiments, constructing a deformation field can include assigning normalized coordinates to the landmark points and additional landmark points of the face mesh. Generally, constructing a deformation field includes grouping the landmark points with the additional landmark points according to different facial feature areas. To perform realistic deformations, the image processing application can add the additional landmark points to a deformation field in a range surrounding the landmark points that are determined to be most useful for modifying (e.g., altering, warping, and/or distorting) a particular facial feature. Each of the normalized coordinates assigned to the landmark points and to the additional landmark points of the face mesh reflect how much a respective landmark point is to change position responsive to receiving selection of a modal control in a modal control interface. Responsive to receiving the selection of the modal control in the modal control interface, the image processing application can modify the facial features associated with the modal control and display the modified facial features with natural and life-like appearance in relation to other facial features of the face.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
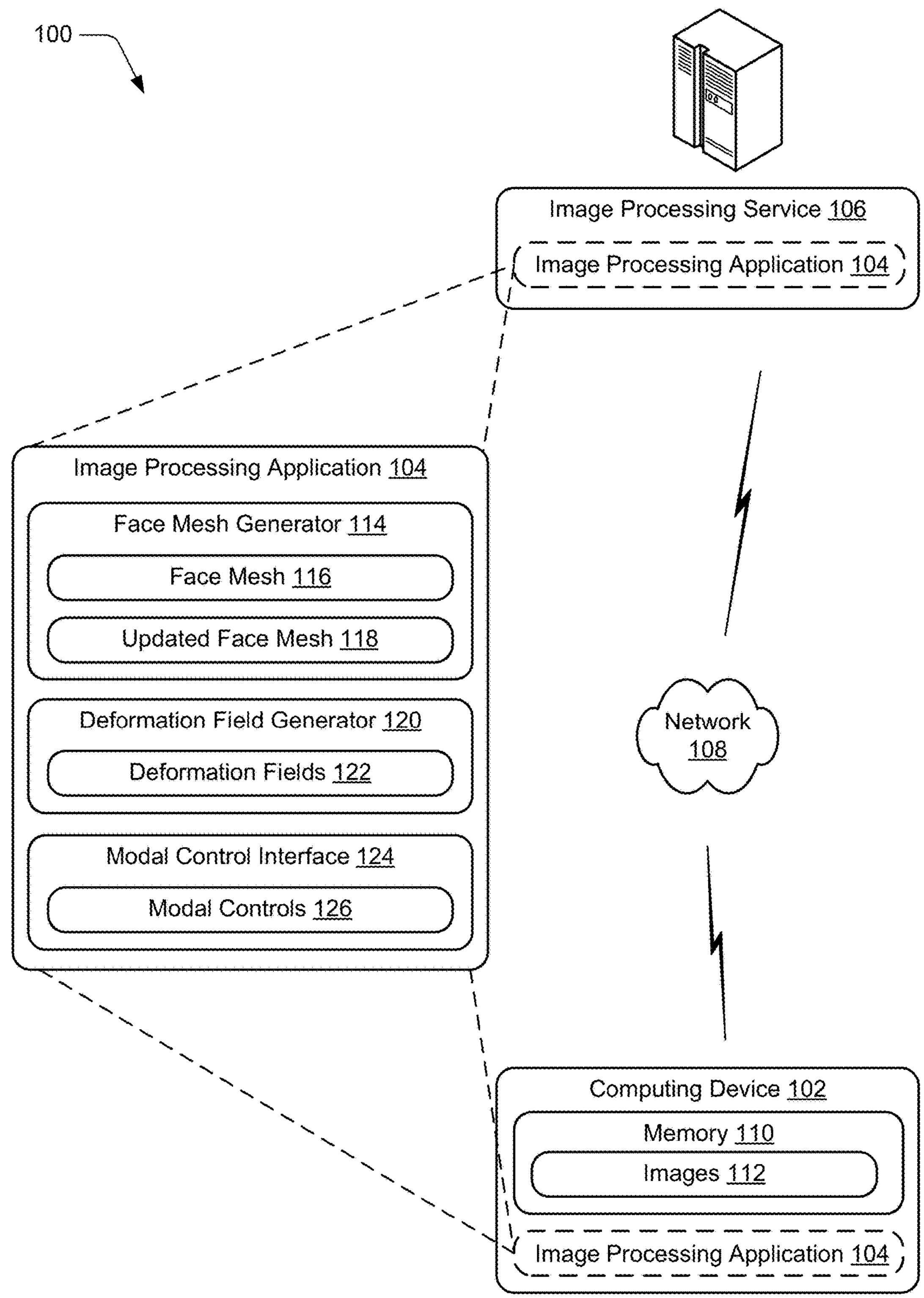
FIG. 1 is an illustration of an environment in an example implementation that is operable to employ techniques described herein.

In embodiments of facial feature liquifying using face mesh, an image processing application is implemented to modify (e.g., alter, warp, deform, and/or distort) facial features of a face in an image using an updated face mesh generated from a combination of deformation fields. The image processing application can generate a face mesh that includes landmark points, and then construct the deformation fields on the face mesh, where the deformation fields are defined by warpable elements (e.g., warpable vectors, warpable lines, warpable landmark points and/or warpable areas) formed from the landmark points. The image processing application can also combine the deformation fields and generate the updated face mesh that includes the combined deformation fields. The image processing application can also receive an input to initiate modifying one or more of the facial features of the face in the image using the combined deformation fields included in the updated face mesh.

The image processing application performs high quality modifying of facial features in an image by generating realistic and fluid deformations, also referred to herein as liquifying facial features. Facial feature liquifying includes modifying a facial feature relative to other facial features such that all the facial features appear fluid relative to one another after the modifying. Facial feature liquifying can also refer to displaying realistic and fluid deformations during modifying of a facial feature.

The image processing application modifies facial features realistically and fluidly by constructing deformation fields on a face mesh and generating an updated face mesh to include the combined deformation fields. Constructing a deformation field can include adding additional landmark points to the face mesh and/or assigning normalized coordinates to landmark points of the face mesh. Generally, constructing a deformation field includes grouping landmark points with the additional landmark points. To perform realistic deformations, the image processing application can add additional landmark points in a range surrounding the landmark points that are determined to be most useful for modifying a particular facial feature.

Each deformation field is associated with a deformation field generator that can be implemented to respond to an input, such as a modal control in a modal control interface, by generating modifications to deformation fields formed from the landmark points and/or the additional landmark points. That is, responsive to the input, modifications are generated to each deformation field based on the warpable elements defined to respective deformation fields. Deformation fields generally correspond to a facial feature area such as an eye, nose, jaw, forehead, cheeks, or mouth, and so on. Modifications made in each deformation field are combined on the updated face mesh to reflect realistic and fluid deformations. For example, modifying a person's mouth in an image can affect other facial features, such as the person's cheeks, and the other facial features are warped to reflect how the person's mouth and cheeks move in real-life.

Modifying the facial features can be initiated via a selection of one or more modal controls in the modal control interface. The modal controls are defined by the image processing application to invoke deformations on an updated face mesh responsive to the selection. In particular, selection of a modal control in the modal control interface causes the image processing application to modify a combination of deformation fields defined on the updated face mesh. In one specific example, the modal control is representative of a slider control that is selectable to cause the combination of deformation fields to modify in accordance with a magnitude of the modal control selection.

In embodiments, the image processing application defines the modal controls in the modal control interface to correspond to a particular modification type for a facial feature. For instance, modal controls can be defined to correspond to eye height, eye width, eye tilt, eye size, face width, jaw shape, and/or chin length just to name a few. Thus, the modal controls in the modal control interface can be defined to invoke a change in shape (e.g., height, width, tilt, and so on) to various facial features, such as the eye, chin, forehead, jaw, cheeks, and/or the overall face. In one specific example, a single selection of a modal control can cause a person's mouth in an updated face mesh displayed on a device to appear realistic by changing a combination of deformation fields.

In embodiments, the image processing application can assign normalized coordinates to each landmark point and additional landmark point on the face in the image for each deformation field. In this way, an updated face mesh generated to include a combination of deformation fields automatically includes normalized coordinates. The normalized coordinates assigned to each landmark point and additional landmark point of each deformation field reflect how much a respective landmark point is to change position responsive to receiving an input. Accordingly, the normalized coordinates for each landmark point on the updated face mesh can be assigned and tuned by the image processing application to invoke deformations that take into consideration a position of all other landmark points on the updated face mesh. For instance, to cause a natural deformation of a facial feature, some portions of the facial feature move noticeable from their current location while other portions of the facial feature experience minimal or no movement. By assigning and tuning the normalized coordinates as described, the image processing application can perform natural deformations to facial features associated with the deformation fields.

In implementations, the image processing application can assign weights to deformation fields in a face mesh to cause some of the deformation fields to deform at a different magnitude relative to deformations in another deformation field. Accordingly, responsive to selection of a modal control, the image processing application can apply the appropriate weighted deformations to the deformation fields and can display realistic and fluid deformations in a display device. The image processing application may also or instead assign weights to portions within the deformation fields, as will be explained below in more detail.

Generally, the image processing application can be implemented in a computing device to provide facial feature modifying functionality. Alternatively, the image processing application can be implemented as an image processing service available in the "cloud" over a computer network. The techniques implemented by the image processing application can be applied via the "cloud" (e.g., an infrastructure and/or a platform that provides resources) to systems and/or devices that desire to perform deformations to a facial feature of an image.

Regardless of how implemented, the image processing application can be implemented to modify a facial feature such that the facial feature appears natural and realistic after being modified. In some instances, such as during manipulation of a modal control in a modal control interface, the corresponding modification of the facial feature can be displayed in real-time in the modal control interface. Displaying natural and realistic modifications by the image processing application can be performed using fewer memory and processing resources than in conventional systems through use of combined deformation fields. That is, because of the manner in which the deformation fields are constructed and assigned to different modal controls, deformations are caused using less processor and/or memory resources in comparison to performing more complicated face mesh algorithms.

In the following discussion, an example environment is first described that may employ the techniques described herein. Next, an example user interface is described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques described herein. The illustrated environment 100 includes a computing device 102, an image processing application 104, an image processing service 106, and a network 108. As illustrated, the computing device 102 includes memory 110 that further includes one or more images 112, while the image processing application 104 implements a face mesh generator 114 that includes a face mesh 116 and an updated face mesh 118, a deformation field generator 120 that includes deformation fields 122, and a modal control interface 124 that includes modal controls 126. The deformation fields 122 are representative of geometric areas on a face mesh that can, in implementations, correspond to different facial features of a face.

The image processing application 104 may be implemented using one or more computing devices, e.g., a server farm, "in the cloud," and so on. For instance, as illustrated, the image processing application 104 can be implemented by the computing device 102 and/or at the image processing service 106. Alternatively or additionally, the image processing application 104 can be implemented in the image processing service 106 as part of a cloud-based service.

The computing device 102, for instance, may be configured as a desktop computer, a laptop computer, a game console, a set-top box, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources, e.g., mobile devices. Additionally, although a single computing device 102 is shown, the computing device 102 may be representative of a plurality of different devices.

The image processing application 104 can be implemented to receive the image 112 that includes one or more faces and generate the face mesh 116 for each of the one or more faces in the image 112. The face mesh 116 includes landmark points that form warpable elements. The landmark points are representative of points, nodes, or markers that are positioned on a face and are combinable with other landmark points to form geometric shapes, such as triangles, that define the face mesh 116. The image processing application 104 can be further implemented to construct the deformation fields 122, add additional landmark points (e.g., additional vertices) to the face mesh 116, and/or assign normalized coordinates to the landmark points and to the additional landmark points. Generally, the normalized coordinates assigned to the landmark points and to the additional landmark points of the face mesh are coordinates that are normalized to a coordinate system by the image processing application 104 in order to reflect a position of a respective landmark point relative to the other landmark and/or the other additional landmark points.

The image processing application 104 can be implemented to combine the deformation fields 122 and generate the updated face mesh 118 to include the combined deformation fields 122 and the respective normalized coordinates assigned to the landmark points and to the additional landmark points in each deformation field. Further, the image processing application 104 can be implemented to display the updated face mesh 118 for altering of a facial feature in the image 112 using the modal controls 126 of the modal control interface 124.

The image processing application 104 can also be implemented to define the modal controls 126 of the modal control interface 124 to correspond to a combination of the deformation fields 122. In this way, responsive to selection of one of the modal controls 126, the image processing application 104 can be implemented to identify the combination of deformation fields 122 to be modified and invoke modifications to the combination of deformation fields 122 in accordance with a magnitude of the selection. In embodiments, the image processing application 104 can be implemented to apply different magnitudes of modifying to different deformation fields making up the combination of deformation fields 122.

In one or more implementations, functionality performed by the image processing application 104 can include outputting the modal control interface 124 for display on a display device of the computing device 102, and receiving inputs via the modal control interface 124 at the computing device 102 directed for the image processing application 104.

Generally speaking, the image processing service 106 can be implemented to make various resources (e.g., content, services, web applications, etc.) available over the network 108, such as the Internet, to provide a "cloud-based" computing environment and web-based functionality to clients. For instance, the image processing service 106 may provide facial feature modifying functionality to the computing device 102. In one specific example, the image processing service 106 utilizes the image processing application 104 to process the image 112, and output the updated face mesh 118 for each face in the image 112 to perform facial feature modifications. In this example, the updated face mesh 118 generated by the image processing service 106 can be sent to the modal control interface 124 of computing device 102 for display responsive to a request to modify a facial feature. Display of the updated face mesh 118 in the modal control interface 124 can include displaying the mesh itself, or alternatively, can include displaying only the face associated with the updated face mesh 118.

The network 108, meanwhile, represents any one or combination of multiple different types of wired and/or wireless networks, such as cable networks, the Internet, private intranets, and so forth. While FIG. 1 illustrates the computing device 102 communicating with the image processing application 104, and/or the image processing service 106 over the network 108, the techniques may apply in any other networked or non-networked architectures. Further, the image processing application 104 can be implemented as an application with the computing device 102 and/or the image processing service 106.

The memory 110 that stores the image 112 can include volatile media (such as random access memory (RAM)) and/or nonvolatile media (such as read only memory (ROM), Flash memory, optical disks, magnetic disks, and so forth). Noted above, the image 112 can include one or faces which can be output in an application and displayed for selection to initiate modifying functionality. Alternatively, the image 112 may be obtained by the computing device 102 from various entities over the network 108, such as the image processing service 106 or a remote image database (not shown). In one or more implementations, functionality performed by image processing application 104 includes outputting the modal control interface 124 for display on a display device of the computing device 102, and receiving inputs via the modal control interface 124 at the computing device 102 directed for the image processing application 104.

Noted above, the face mesh generator 114 is representative of functionality to generate the face mesh 116 and the updated face mesh 118. For instance, responsive to receiving the image 112, the face mesh generator 114 generates the face mesh 116 for the one or more faces in the image 112. The face mesh generator 114 can execute, for example, Delaney Triangulation, linear interpolation, and/or cubic interpolation techniques to generate the face mesh 116. For instance, Delaney Triangulation can be performed to define triangle indices for the vertices, such as the landmark points. In one or more implementations, the face mesh generator 114 can perform linear interpolation to determine landmark points on or around cheek and/or nose facial features.

The face mesh generator 114 can be implemented to add additional landmark points from those already included in the face mesh 116. The additional landmark points can be defined on the updated face mesh 118 by performing, for instance, linear and/or cubic interpolation on the landmark points. For instance, the additional landmark points can be added to areas surrounding a particular facial feature. In one specific implementation, the face mesh generator 114 is implemented to add additional landmark points corresponding to the eye by performing cubic interpolation on the landmark points. Each face mesh generated for each face includes landmark points that are combinable to form warpable elements (e.g., warpable vectors, warpable lines, and/or warpable areas) that define how the deformation fields 122 are to be modified in response to a selection of one or more of the modal controls 126.

To ensure that the modifications to facial features of a face appear realistic, the deformation field generator 120 can be implemented to define and/or construct deformation fields 122 on the face mesh 116 in a variety of ways. Generally, constructing the deformation fields 122 includes grouping the existing landmark points with additional landmark points. The deformation field generator 120 may also or instead be implemented to define displacement values (direction and magnitude) for warpable elements defined from the vertices of the updated face mesh 118. In one or more implementations, the deformation field generator 120 defines displacement values for warpable vectors such that different warpable vectors associated with a same landmark point and/or same additional landmark point are defined relative to each other. The defined displacement values for the warpable vectors can, in some instances, be in the form of normalized coordinates.

Additionally or alternatively, the deformation field generator 120 can be implemented to assign normalized coordinates to the landmark points and to the additional landmark point of each deformation field. In this way, the updated face mesh 118 is generated to include a combination of deformation fields 122 that automatically includes the normalized coordinates for each landmark point in each deformation field. The normalized coordinates assigned to each landmark point and additional landmark point of each deformation field reflect how much a respective landmark point is to change position responsive to receiving an input, such as selection of one or more of the modal controls 126. Further, the normalized coordinates assigned to each landmark point and/or additional landmark point of each deformation field enables uniform displacement design for different face shapes.

To assign normalized coordinates to the landmark points and to the additional landmark point of each deformation field, the deformation field generator 120 can be implemented to define a normalized coordinate system and assign normalized coordinates based on the defined normalized coordinate system. Accordingly, the normalized coordinates for each landmark point on the updated face mesh 118 can be assigned and tuned by the deformation field generator 120 to invoke deformations that take into consideration a position of all other landmark points on the updated face mesh 118. This ensures that landmark points of the face move relative to one another naturally because movement of the landmark points are normalized to a coordinate system defined specifically to maximize liquifying effects of the deformation. Features of the normalized coordinates and the defined normalized coordinate system are discussed in more detail below in relation to FIGS. 2 and 3.

Further, the deformation field generator 120 can be implemented to assign weights to the deformation fields 122 so that a magnitude of deformations in one deformation field differs from a magnitude of deformations in another deformation field. The deformation field generator 120 can also be implemented to assign weights to portions within the deformation fields 122 so that the different portions deform within the deformation field according to the weight assigned to the respective portion. Thus, the image processing application 104 can be implemented to generate modified facial features that appear realistic responsive to adding the additional landmark points, assigning normalized coordinates to the landmark points, assigning the weights to the deformation fields 122, and/or assigning weights to portions within the deformation fields 122, or a combination thereof.

In embodiments, the deformation field generator 120 is representative of functionality to assign weights to different portions within a deformation field in the face mesh 116 to cause the different portions to deform at different magnitudes responsive to selection of one or more of the modal controls 126. For instance, a deformation field around the eye can include different left, right, upper and lower portions, which can be weighted so that landmark points in the upper and lower portions of the deformation field deform with different magnitudes. The weighted portions within deformation fields 122 can be used in addition to or separately from the assigned normalized coordinates to deform facial features. For instance, when used together to modify facial features, the normalized coordinates of the landmark points determine their position generally, while the weights assigned to the deformation fields 122 (or portions within a particular deformation field) further skew the landmark points within the deformation fields 122.

After construction of the deformation fields 122, the face mesh generator 114 can generate the updated face mesh 118 by combining the deformation fields 122. For instance, the landmark points of each deformation field are combined on a normalized coordinate system such that each landmark point is deformed based on its location within the normalized coordinate system.

In one or more implementations, the deformation field generator 120 can be further implemented to generate modifications to the deformation fields 122 of the updated face mesh 118. For instance, responsive to receiving an input of the modal control 126, the deformation field generator 120 generates modifications to the landmark points forming each warpable element. Modifying the landmark points by the deformation filed generator 120 can include deforming, relocating, and/or changing positions of the landmark points using the normalized coordinates assigned to the landmark points. Because the normalized coordinates indicate a position of each landmark point relative to the other landmark points, landmark points within the deformation fields 122 are deformed in accordance with a magnitude associated with the received input of the modal control 126. In embodiments when the deformation field generator 120 assigned weights to different portions of the deformation fields 122, the weights assigned to the different portions further deform the landmark points.

As shown in FIG. 1, the modal control interface 124 is representative of functionality to display the modal controls 126 and to receive a selection of the modal control 126 to initiate a modification to a facial feature of a face in the image 112. The modal control interface 124 can also be implemented to define the modal controls 126 to invoke deformations on the updated face mesh 118 responsive to selection of one of the modal controls 126. For instance, modifying facial features on the updated face mesh 118 can be initiated via a selection of the modal control 126 in the modal control interface 124. Each of the modal controls 126 are defined by the modal control interface 124 to be mapped to a combination of deformation fields 122. In this way, a selection of a single modal control labeled jaw shape', for instance, can invoke deformations to the combination of deformation fields 122 defined for this modal control.

In embodiments, the modal control interface 124 defines the modal controls 126 to correspond to a desired modification to a facial feature. For instance, the modal controls 126 can be defined to correspond to eye height, eye size, eye width, eye tilt, upper lip, lower lip, mouth width, nose width, smile, face width, jaw shape, and/or chin length, just to name a few.

Figure 2:
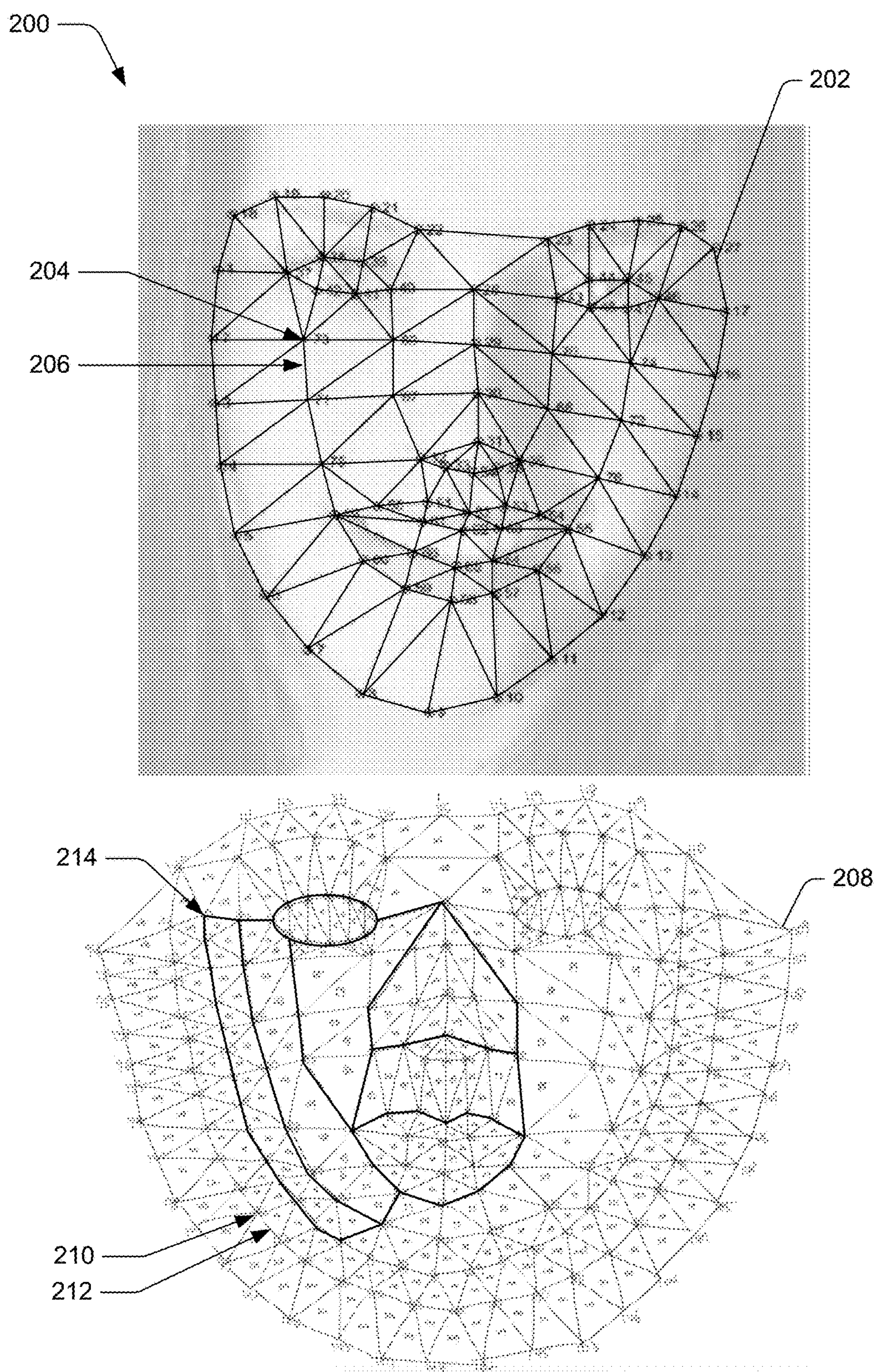
FIG. 2 depicts a representation of a scenario in an example implementation in which the image processing application generates an updated face mesh for modifying facial features.

FIG. 2 depicts generally at 200 an example implementation in which the image processing application 104 of FIG. 1 generates an updated face mesh for modifying facial features. As represented in FIG. 2, a face mesh 202 is generated to include landmark points 204 and warpable vectors 206 formed from the landmark points 204. Other warpable elements may be formed from the landmark points, such as warpable lines or warpable areas (not shown). In one specific implementation, the face mesh generator 114 generates the face mesh 202 by performing face mesh generation techniques on a face in an image received at the image processing application 104. Although only pointing to a single example landmark point in FIG. 2, multiple landmark points 204 are represented as intersection points, or vertices, from which different vectors can be defined. For instance, each vector describes a direction on an x-axis and a y-axis and a magnitude defined relative to other associative vertices.

As illustrated in FIG. 2, the face mesh 202 serves as a base mesh on which the face mesh generator 114 can generate updated face mesh 208 by adding additional landmark points 210 that define additional warpable vectors 212. For instance, the additional landmark points 210 can be added in a range in or around a particular facial feature determined to be most useful for modifying the particular facial feature. That is, adding landmark points on the face mesh 202 can include adding the additional landmark points 212 to specific portions within a deformation field 214 according to how the portions of the deformation field 214 typically move in real-life. For instance, when modifying eye height, not all portions of the eye change equally in real-life. Instead, areas close to the top or bottom of the eye may change less than or more than areas in the center of the eye, depending on the desired deformation. Thus, the additional landmark points 210 can be added to particular portions of the deformation fields around the person's eye based on how the different portions relate relative to one another in real-life.

To construct the deformation fields 214, the deformation field generator 120 can be implemented to group the landmark points 204 and the additional landmark points 210. For instance, as illustrated in FIG. 2, some example deformation fields 214 are constructed, though in implementations, the updated face mesh 208 will include additional deformation fields (not shown) to ensure that the updated face mesh 208 includes a series of connected deformation fields that encompass all the landmark points 204 and the additional landmark points 210. Thus, the deformation fields 214 can be thought of as areas that include landmark points 204 and/or the additional landmark points 210 and that are grouped according to facial features. Some deformation fields 214 can be constructed around the eye, nose, and/or mouth, for instance.

In one specific example, the additional landmark points 210 are added to the landmark points 204 of the face mesh 202 to form a curve using cubic interpolation. That is, the additional landmark points 210 can be added by the image processing application 104 between two of the landmark points 204 to improve curves formed from the landmark points 204. In particular, the image processing application 104 can be implemented to apply cubic interpolation tools to add the additional landmark points 210 in areas around the eyes, mouth, and/or jaw. As illustrated in FIG. 2, the deformation field 214 located near the eye includes the additional landmark points 210 that were added by applying the cubic interpolation tools thereby causing the defamation field 214 located near the eye to curve.

In implementations that include receiving an input to modify facial features on a face in an image, the image processing application 104 can be implemented to apply cubic interpolation tools to determine displacement values (magnitude and direction) for the additional warpable vectors 212 of each deformation field 214. For instance, the deformation field generator 120 can be implemented to calculate a displacement value and direction for each of the additional warpable vectors 212 by applying one or more cubic interpolation steps to displacement values and directions associated with the warpable vectors 206. In one specific example, the deformation field generator 120 calculates displacement values for the additional warpable vectors 212 using a minimum number of displacement values associated with the warpable vectors 206. In one specific example, five or more displacement values associated with the warpable vectors 206 are used to calculate displacement values for one of the additional warpable vectors 212. Thus, cubic interpolation tools can be applied by the image processing application 104 to determine the position of the additional landmark points 210 as well as to calculate the displacement values and directions for the additional warpable vectors 212 that are defined from the additional landmark points 210.

In one or more implementations, each landmark point 204 and additional landmark point 210 of each deformation field 214 are assigned normalized coordinates by the deformation field generator 120. In this way, the updated face mesh 208 is generated to include a combination of deformation fields 214 having normalized coordinates assigned to the landmark points 204 and the additional landmark points 210. By constructing and using the deformation fields and/or assigning the normalized coordinates as described above and below, the image processing application 104 performs natural deformations to facial features associated with the deformation fields 210.

Figure 3:
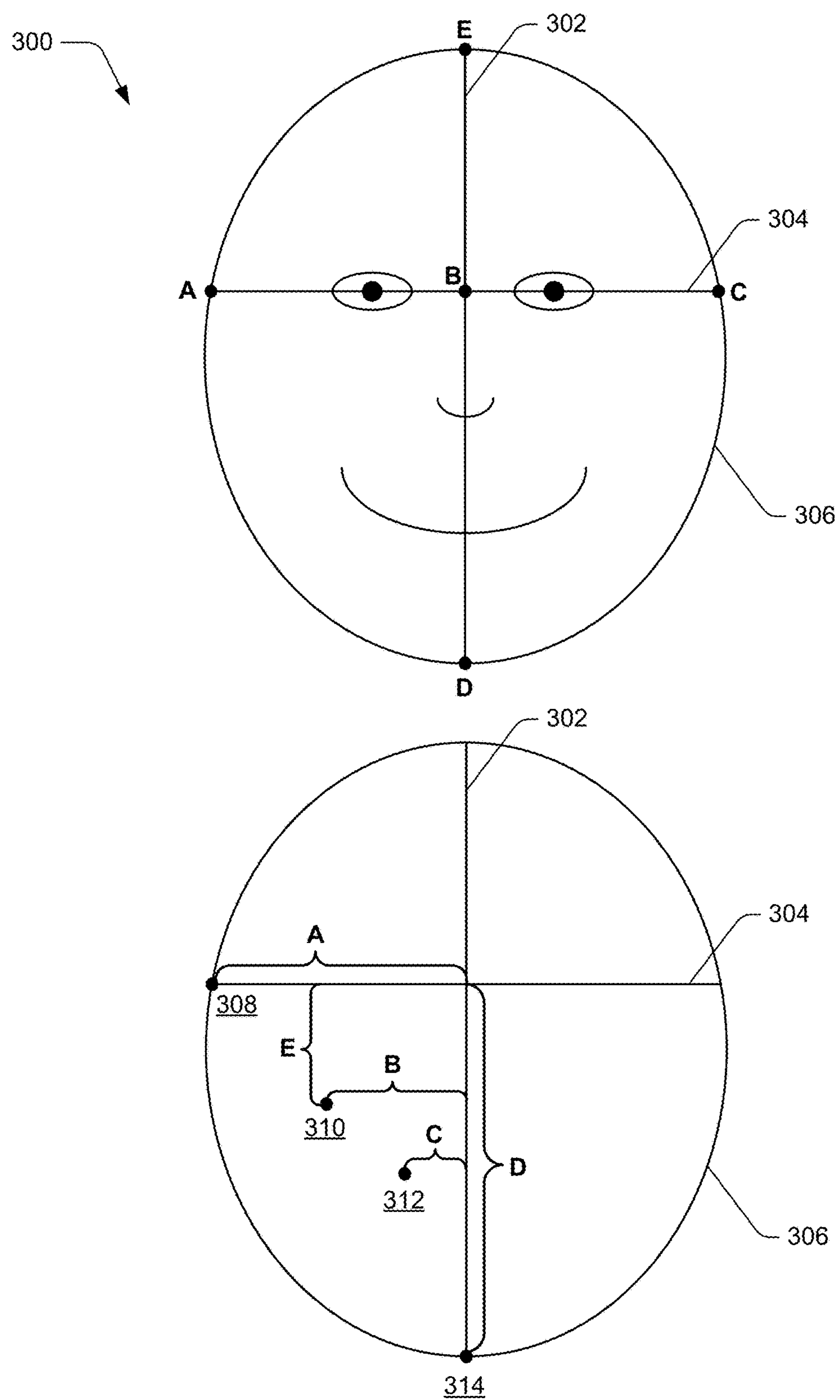
FIG. 3 depicts a representation of an example normalized coordinate system defined by the image processing application for assigning normalized coordinates to elements of the updated face mesh.

FIG. 3 depicts generally at 300, a representation of an example normalized coordinate system that is defined by the image processing application 104 for assigning normalized coordinates to landmark points and additional landmark points of an updated face mesh. As described below, the normalized coordinate system as depicted in FIG. 3 can further be designed in a variety of ways to produce normalized displacement values for warpable vectors that reflect a calculated width/height ratio and/or calculated left/right ratio.

As illustrated in FIG. 3, the example normalized coordinate system includes two reference axes, 302 and 304, which generally correspond to an x-axis and a y-axis, respectively, and an updated face mesh 306. The two reference axes define the width and height of a face included in the updated face mesh 306. Therefore, the normalized coordinates assigned using the two reference axes 302 and 304 reflect a width/height ratio and a left/right ratio of the face.

To produce realistic and fluid deformations, the image processing application 104 can be implemented to generate the reference axes 302 and 304 to reflect different width/height ratios and/or different left/right ratios of the face included in the updated face mesh 306. For instance, as illustrated in the upper portion of FIG. 3, the face width equals a distance from points A to C on the axis 304 while the face height equals a distance from points B to D on the axis 302 multiplied by a height factor. Here, the height factor is determined by the image processing application 104 to cause the face to change from its current height to a different height. In one specific example, the height factor is 1.3 and produces an ideal height to width ratio for the face which causes the updated face mesh 306 to be re-sized from its current shape. Alternatively, in other examples, the face height can equal the distance from points D to E on the axis 302.

In embodiments, to produce realistic and fluid deformations, the image processing application 104 can be implemented to generate the reference axes 302 and 304 by assigning the point B at an approximate center of the face included in the updated face mesh 306. In alternative embodiments, however, the point B can be assigned by the image processing system to a location other than the face center to achieve a desired width/height ratio and a left/right ratio of the face. For instance, the point B may not be centered when an orientation of the face is tilted and/or turned. In this way, the normalized coordinate system, and specifically the reference axes 302 and 304, can be designed to assign the normalized coordinates for each of the landmark points 204 and the additional landmark points 210 on the updated face mesh 306 that take into consideration a position of all other landmark points on the updated face mesh 306.

Accordingly, a width and/or height of the face in the updated face mesh 306 can be modified to achieve a desired width/height ratio and/or a desired left/right ratio for the updated face mesh 306. To achieve the desired width/height ratio and/or left/right ratio for the updated face mesh 306, the updated face mesh 306 can be modified in size or shape during construction of the deformation fields and prior to the updated face mesh 306 being generated to ensure that the desired ratio is met. In one specific example, the image processing application 104 defines the normalized coordinate system on the updated face mesh 306 to minimize a difference between a distance of the reference axis 302 and a distance of the reference axis 304. By defining the normalized coordinate system to include the reference axes 302 and 304 with a minimal difference between respective distances, more realistic deformations are possible due to the reference axes 302 and 304 representing an 'ideal' face ratio for liquifying facial features in a realistic manner. Accordingly, defining the normalized displacement values of the warpable vectors from the normalized coordinate system represents an improved deformation design in comparison to conventional deformation techniques.

In embodiments, assigning the normalized coordinates includes assigning coordinates to the different landmark points based on a ratio of distances of a respective landmark point from the two reference axes. For instance, as illustrated in the lower portion of FIG. 3, landmark points 308-314 are positioned at distances A-E from one of the reference axis 302 or the reference axis 304. The normalized coordinates are indicative of a deformation magnitude to be invoked for each particular landmark point responsive to selection of a modal control in a modal control interface. For instance, a deformation magnitude associated with the landmark point 308 relative to the reference axis 302 can be a value of 1. Then, a deformation magnitude associated with the landmark point 310 can be a ratio of distance B divided by distance A. Similarly, a deformation magnitude associated with the landmark point 312 can be a ratio of distance C divided by distance A. In this way, the deformation magnitudes for all the landmark points and the additional landmark points are determined relative to the reference axis 302. Meanwhile, a deformation magnitude associated with landmark point 314 can be a value of 1. A deformation magnitude associated with the landmark point 310 relative to the reference axis 304 can be a ratio of distance E divided by distance D. Consequently, deformation magnitudes are provided for all the landmark points and the additional landmark points relative to the reference axes 302 and 304 in the form of normalized coordinates.

In embodiments, normalized coordinates assigned to all the landmark points and the additional landmark points are indicative of each landmark point's respective location relative to the normalized coordinate system, and relative to the other landmark points. Further, the deformation magnitude of each landmark point reflects the distances from the reference axes 302 and 304. This allows the landmark point 310 near the reference axis 302 to move less, and more naturally, relative to the landmark point 308 further from the reference axis 302. Thus, responsive to a selection of the modal control in the modal control interface, the image processing application 204 can be implemented to generally modify landmark points positioned further from the reference axis 302 with a greater magnitude than the landmark points positioned closer to the reference axes 302.

Various actions such as generating, adding, assigning, defining, identifying, constructing, and so forth performed by various modules are discussed herein. It should be appreciated that the various modules may be configured in various combinations with functionality to cause these and other actions to be performed. Functionality associated with a particular module may be further divided among different modules and/or the functionality represented by multiple modules may be combined together into a single logical module. Moreover, a particular module may be configured to cause performance of action directly by the particular module. In addition or alternatively the particular module may cause particular actions by invoking or otherwise accessing other components or modules to perform the particular actions (or perform the actions in conjunction with that particular module).

Example User Interface

Figure 4:
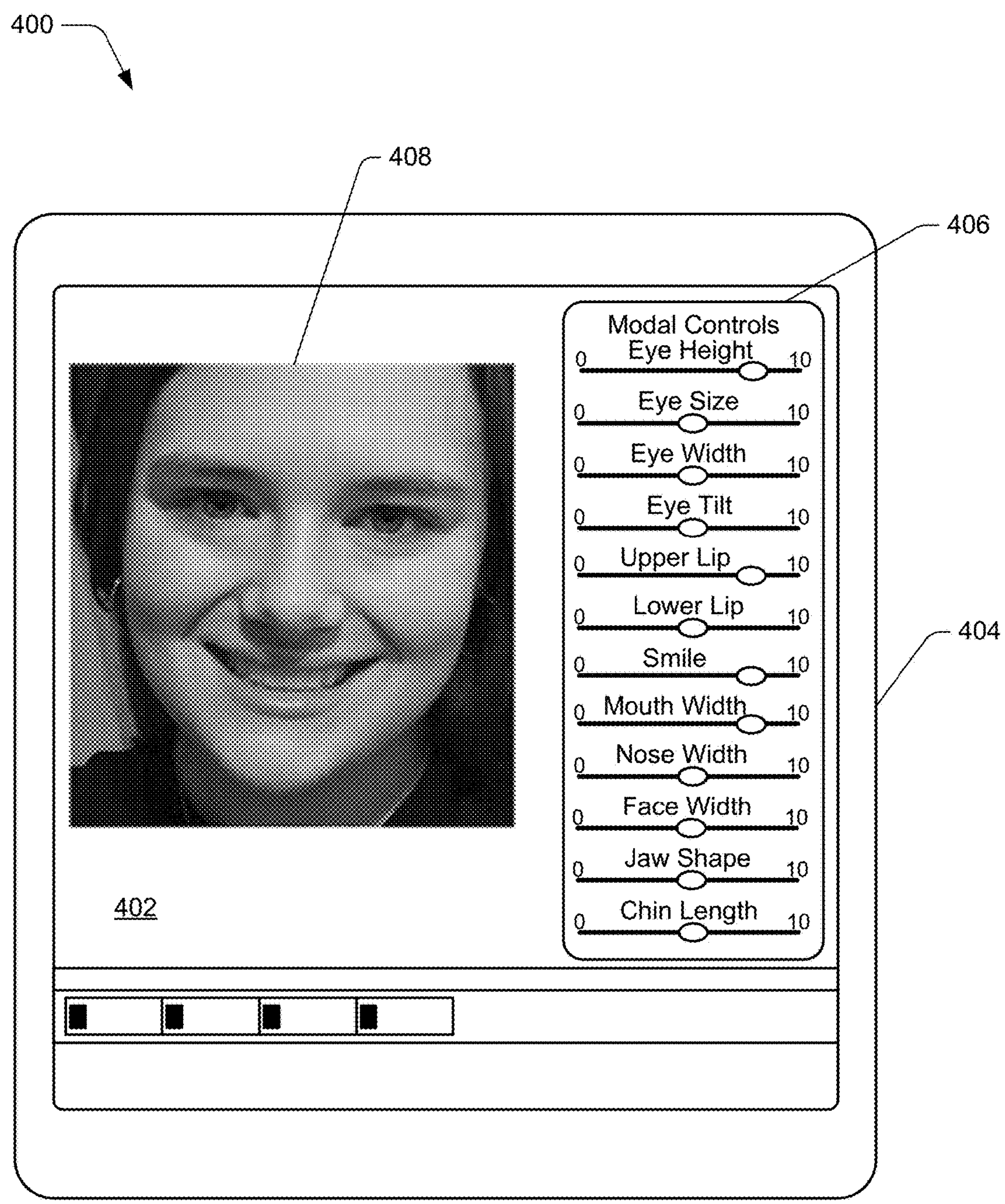
FIG. 4 depicts a representation of an example user interface for interfacing with the image processing application.

Having considered an example environment for modifying facial features by the image processing application, consider now a representation 400 in FIG. 4 of an example modal control interface for interfacing with the image processing application to modify facial features. As illustrated, the modal control interface 402 is displayed on display device 404 and includes modal controls 406 and an image 408. Generally, the modal control interface 402 is representative of functionality to initiate modifying of facial features of a face in the image 408 via selection of one or more of the modal controls 406. In particular, selection of one or more of the modal controls 406 in the modal control interface 402 causes the image processing application 104 to modify a combination of deformation fields defined on an updated face mesh that is generated for the image 408, such as the updated face mesh 118.

In the illustrated modal control interface 402, the modal controls 406 are representative of slider controls, however other types of input or controls are contemplated. In a specific embodiment, operating one of the modal controls 406 causes the combination of deformation fields to modify on the display device 404 in accordance with a magnitude of the modal control selection. Thus, the modal controls 406 in the modal control interface 402 can be implemented to invoke a change in shape (e.g., height, width, tilt, and so on) to various facial features, such as the eye, chin, forehead, jaw, and the overall face, in the image 408 using the updated face mesh 118.

The image 408 can include an underlying updated face mesh (not shown), depending on the implementation. For instance, the image 408 can be displayed in the modal control interface 402 responsive to a user selecting one of the images 112 stored in the memory 110 on the computing device 102. In this instance, the image 408 is processed by the image processing application 104 upon selection to generate the updated face mesh 118, which is then available to perform face modifying of the image 408 either by being visibly shown on the display device 404, or alternatively, by being 'under' the face in the image 408.

Consider the example modal control for 'Eye Height' in more detail. A deformation field constructed near the eye is combined with one or more deformation fields around the eye and defined to the 'Eye Height' modal control. Selection of the modal control for 'Eye Height' causes the image processing application 104 to identify the normalized coordinates within the deformation fields defined for the 'Eye Height' control and warp the eye height by applying deformation magnitudes to the normalized coordinates as described herein. By applying deformation magnitudes to the normalized coordinates of the landmark points and/or the additional landmark points in the deformation fields, the image processing application 104 can perform natural deformations to facial features such as eye height.

Example Procedures

The following discussion describes prediction techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. Moreover, any one or more blocks of the procedure may be combined together or omitted entirely in different implementations. Moreover, blocks associated with different representative procedures and corresponding figures herein may be applied together. Thus, the individual operations specified across the various different procedures may be used in any suitable combinations and are not limited to the particular combinations represented by the example figures. In portions of the following discussion, reference may be made to the examples of FIGS. 1-4. In at least some implementations, procedures 500 and/or 600 may be performed by a suitably configured computing device such as computing device 102 of FIG. 1 having an image processing application 104 or as described in relation to FIG. 7.

Figure 5:
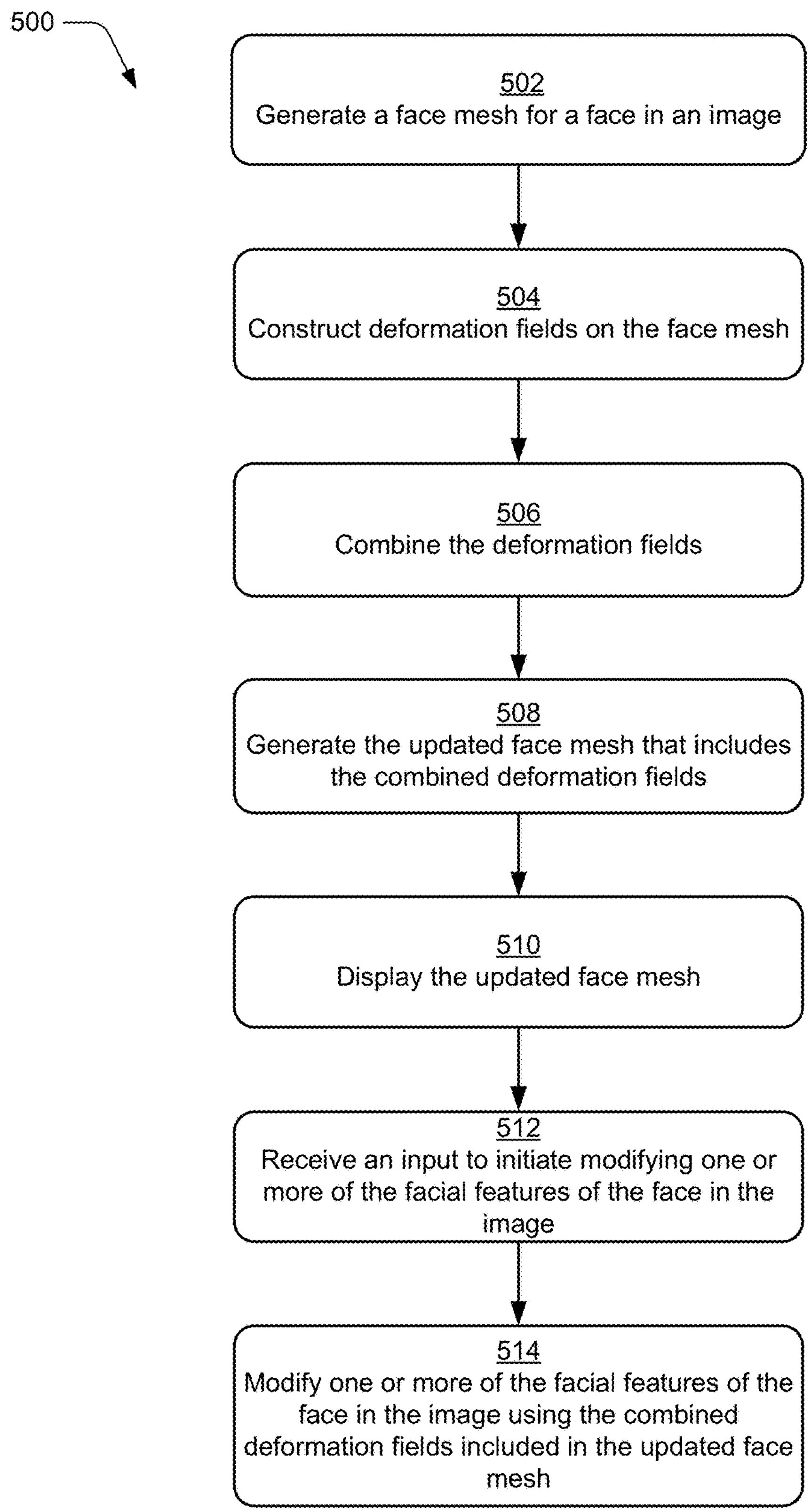
FIG. 5 is a flow diagram depicting a procedure in which the image processing application generates an updated face mesh for modifying facial features.

FIG. 5 is a flow diagram depicting a procedure 500 in which the image processing application generates an updated face mesh for modifying facial features. A face mesh is generated for a face in an image (block 502). For example, the computing device 102 may send a request to modify an image to the image processing application 104 which then generates a face mesh that includes landmark points. Deformation fields are constructed on the face mesh (block 504). For instance, in one or more implementations, the deformation field generator 120 constructs the deformation fields using any of the techniques described herein.

In one or more implementations, the deformation fields are combined by the deformation field generator 120 (block 506). In one specific implementation, the landmark points of each deformation field are combined on a normalized coordinate system such that each landmark point is deformable based on its location within the normalized coordinate system. Additionally or alternatively, the deformation fields can be combined responsive to the deformation field generator 120 applying linear or non-linear interpolating algorithms to values of the deformation fields 122, such as the normalized coordinate values.

An updated face mesh is generated that includes the combined deformation fields (block 508). For instance, the face mesh generator 114 can generate and output the updated face mesh 118. In embodiments, the updated face mesh 118 can include the additional landmark points 210 and normalized coordinates assigned to the landmark points 204 and the additional landmark points 210. By constructing deformation fields on the face mesh and generating the updated face mesh to include the combined deformation field, the image processing application 104 is enabled to deform facial features realistically and fluidly.

The updated face mesh is displayed on a display device (block 510). For instance, the updated face mesh 118 can be displayed in a user interface of computing device 102 in FIG. 1. For instance, the modal control interface 402 can be implemented on the computing device 102 to display the updated face mesh 118. In one specific implementation, the updated face mesh 118 is displayed with the face transparent while the mesh itself is not visible such that changes to the face are displayed without viewing the mesh associated with the updated face mesh 118.

An input is received to initiate modifying one or more of the facial features of the face in the image (block 512). For instance, a modal control 406 is selected from the modal control interface 402 of FIG. 4. One or more facial features of the face in the image are modified using the combined deformation fields included in the updated face mesh (block 514). In one specific embodiment, the normalized coordinates assigned to the landmark points and to the additional landmark points determine how each of the respective landmark points are to be deformed relative to one another responsive to selection of the modal control 126.

Figure 6:
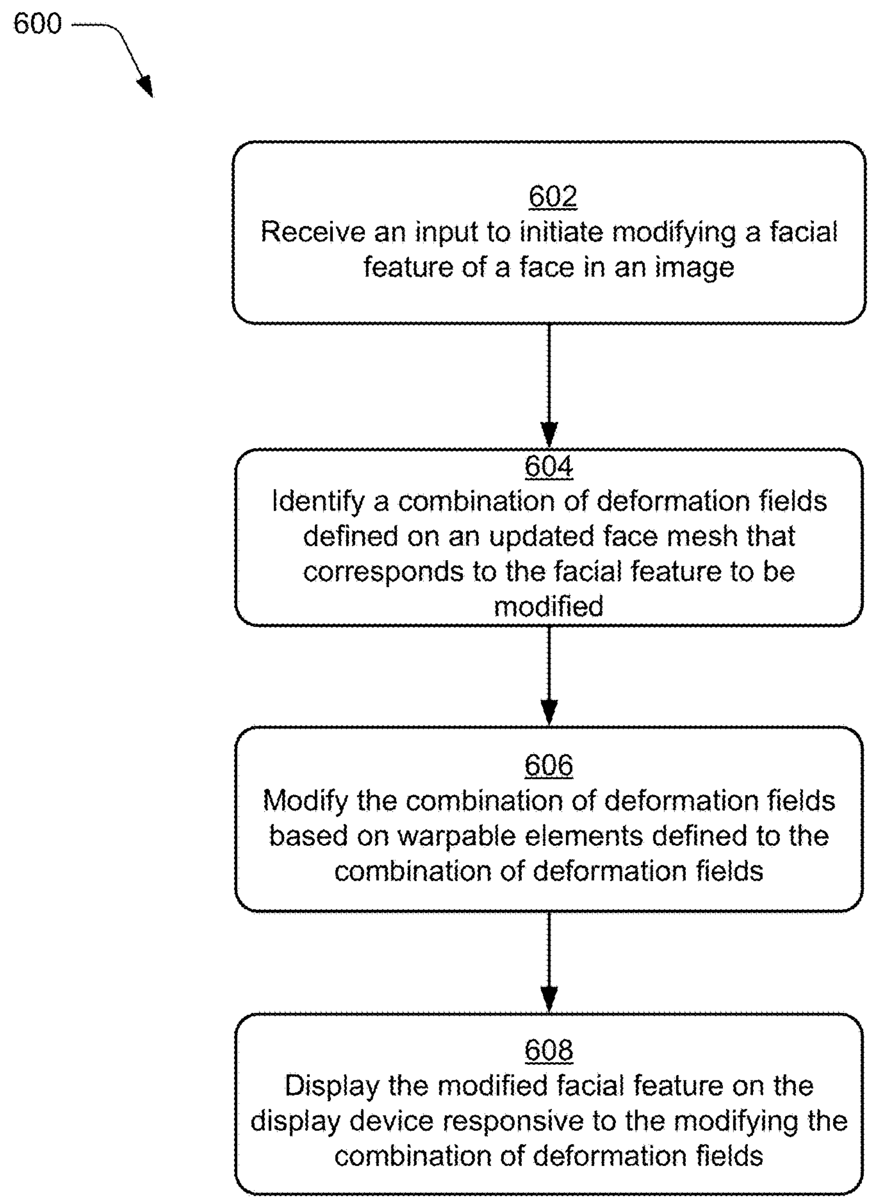
FIG. 6 is a flow diagram depicting a procedure for modifying facial features by the image processing application.

Having considered an example procedure for generating an updated face mesh, consider now a procedure 600 in FIG. 6 for modifying facial features by the image processing application.

An input to initiate modifying a facial feature of a face is received (block 602). For example, the image processing application 104 receives an input via a user interface indicating a desire to modify a facial feature. In one specific example, the modal control 406 is selected from the modal control interface 402 to invoke deformations to a combination of deformation fields of an updated face mesh. A combination of deformation fields defined on the updated face mesh and that correspond to the facial feature to be modified are identified (block 604). For instance, the image processing application 104 can identify two or more deformation fields defined to the modal control 406 using a pre-defined mapping between the modal control 406 and the available deformation fields on the updated face mesh.

The combination of the deformation fields are modified based on warpable elements defined to the combination of the deformation fields, and in accordance with the magnitude associated with the received input (block 606). For instance, responsive to identifying the deformation fields defined to the selected modal control, the image processing application 104 generates deformations individually within each identified deformation field and uses a linear transformation algorithm to combine the individual deformations of each deformation field to produce the overall deformation on the updated face mesh. The modified facial feature is displayed on the display device responsive to the modifying the combination of decreasing fields (block 608). For instance, the landmark points and additional landmark points deform according to normalized coordinates assigned to each landmark point and/or weights assigned to each deformation field thereby causing the modified facial feature to appear natural and life-like compared to other facial features of the face.

Example System and Device

Figure 7:
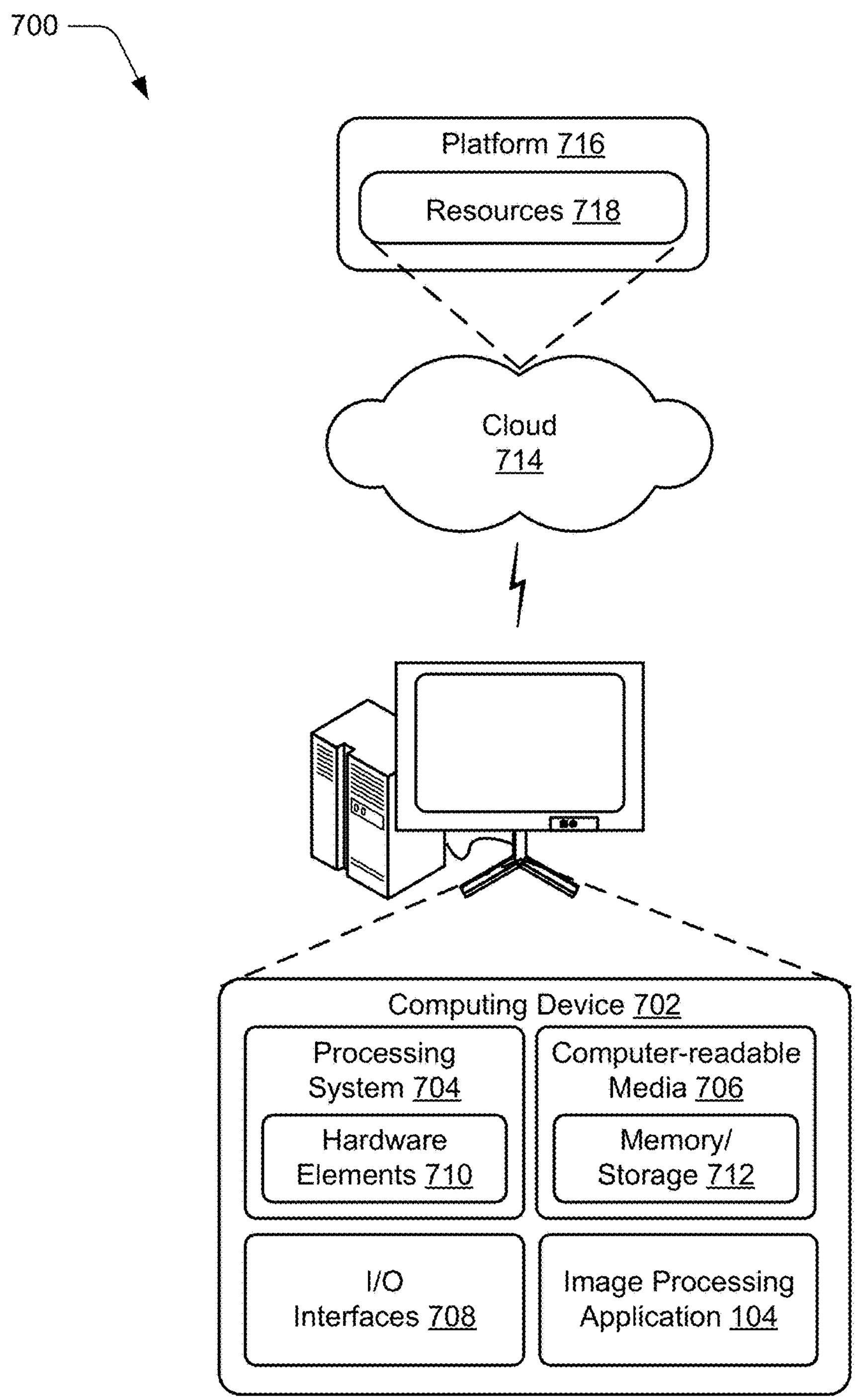
FIG. 7 illustrates an example system including an example device that is representative of one or more computing systems and/or devices that may implement the various techniques described herein.

FIG. 7 illustrates an example system 700 that, generally, includes an example computing device 702 that is representative of one or more computing systems and/or devices that may implement the various techniques described herein. This is illustrated through inclusion of the image processing application 104. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors, e.g., electronic integrated circuits (ICs). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media, e.g., Flash memory, a removable hard drive, an optical disc, and so forth. The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in one or more implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 600. For example, the functionality may be implemented in part on the computing device 702 as well as via the platform 716 that abstracts the functionality of the cloud 714.

CONCLUSION

Although the techniques have been described in language specific to structural features and/or methodological acts, it is to be understood that the subject matter defined in the appended claims is not necessarily limited to the specific features or acts described. Rather, the specific features and acts are disclosed as example forms of implementing the claimed subject matter, and other equivalent features and methods are intended to be within the scope of the appended claims. Further, various different embodiments are described and it is to be appreciated that each described embodiment can be implemented independently or in connection with one or more other described embodiments.

What is claimed is:

1. An image processing application implemented to modify facial features of a face in an image using an updated face mesh generated from a combination of deformation fields, the image processing application comprising:

a face mesh generator configured to generate a face mesh for the face in the image, the face mesh including landmark points of the face;

a deformation field generator configured to construct the deformation fields on the face mesh and combine the deformation fields, the deformation fields including warpable elements formed from the landmark points;

the face mesh generator further configured to generate the updated face mesh that includes the combined deformation fields; and a modal control interface to display the updated face mesh, the modal control interface configured to receive an input to initiate modifying one or more of the facial features of the face in the image using the combined deformation fields included in the updated face mesh.

2. The image processing application as described in claim 1, wherein the warpable elements include warpable vectors formed from the landmark points and wherein, to construct the deformation fields, the deformation field generator is configured to assign normalized coordinates to the landmark points of the face mesh and group the landmark points according to different facial feature areas.

3. The image processing application as described in claim 1, wherein the warpable elements include warpable vectors formed from the landmark points and wherein to construct the deformation fields, the face mesh generator is configured to add additional landmark points to the face mesh, the deformation fields including additional warpable vectors formed from the additional landmark points.

4. The image processing application as described in claim 3, wherein to construct the deformation fields, the deformation field generator is configured to assign normalized coordinates to the landmark points and to the additional landmark points of the face mesh, each of the assigned normalized coordinates reflecting how much a respective landmark point is to change position responsive to the input being received in the modal control interface.

5. The image processing application as described in claim 1, wherein the deformation field generator is further configured to modify one or more of the facial features of the face in the image using the combined deformation fields included in the updated face mesh in response to the input to initiate modifying the one or more of the facial features of the face in the image.

6. The image processing application as described in claim 1, wherein to combine the deformation fields, the deformation field generator is configured to apply a linear transformation algorithm to values of each of the deformation fields.

7. The image processing application as described in claim 1, wherein each of the deformation fields corresponds to a particular facial feature, and wherein the deformation field generator is further configured to modify the two or more deformation fields in response to the input to initiate modifying the one or more of the facial features of the face in the image.

8. The image processing application as described in claim 1, wherein to combine the deformation fields, the deformation field generator is configured to assign a weight to each of the deformation fields, the weight of a deformation field indicative of the usefulness of the deformation field in modifying a particular facial feature.

9. A method implemented by an image processing application for modifying facial features of a face in an image using an updated face mesh generated from a combination of deformation fields, the method comprising:

generating a face mesh for the face in the image, the face mesh including landmark points of the face;

constructing the deformation fields on the face mesh, the deformation fields including warpable elements formed from the landmark points;

combining the deformation fields;

generating the updated face mesh that includes the combined deformation fields; and displaying the updated face mesh in a user interface that is configured to receive an input to initiate modifying one or more of the facial features of the face in the image using the combined deformation fields included in the updated face mesh.

10. The method as described in claim 9, wherein the warpable elements include warpable vectors formed from the landmark points, and further comprising adding additional landmark points to the face mesh, the deformation fields including additional warpable vectors formed from the additional landmark points, and wherein the warpable vectors and the additional warpable vectors in the combined deformation fields define how the facial features modify responsive to receiving the input to initiate the modifying of the one or more of the facial features of the face in the image.

11. The method as described in claim 9, wherein the constructing the deformation fields on the face mesh includes assigning normalized coordinates to the landmark points included in the face mesh.

12. The method as described in claim 11, further comprising applying different magnitudes of change to at least two different deformation fields using the assigned normalized coordinates responsive to receiving the input.

13. The method as described in claim 9, further comprising assigning normalized coordinates to different ones of the landmark points based on distances of each respective landmark point from two reference axes.

14. The method as described in claim 13, wherein the assigning the normalized coordinates includes assigning values to respective landmark points based on a distance between the respective landmark point and at least one additional landmark point.

15. A computing device for modifying a facial feature of a face included in an image using an updated face mesh generated from a combination of deformation fields, the computing device comprising:

a display device configured to display the image of the face;

one or more processors to implement an image processing application configured to perform operations comprising:

receiving an input to the image of the face to initiate modifying the facial feature of the face;

identifying the combination of deformation fields defined on the updated face mesh that corresponds to the facial feature;

modifying the combination of deformation fields based on warpable elements defined to the combination of deformation fields, and in accordance with a magnitude associated with the received input; and displaying the altered facial feature on the display device responsive to the modifying the warpable elements in the combination of deformation fields, the altered facial feature being displayed with a natural and life-like appearance in relation to other facial features of the face.

16. The computing device of claim 15, wherein the warpable elements include warpable vectors formed from the landmark points and wherein the deformations to the combination of deformation fields are caused by deformations made to the landmark points forming each warpable vector based on normalized coordinates assigned to the landmark points that indicate a position of each landmark point relative to the other landmark points.

17. The computing device of claim 15, wherein the normalized coordinates assigned to the landmark points are determined from a set of reference axes defined on the updated face mesh to optimize an ideal face width to face height ratio.

18. The computing device of claim 15, wherein a magnitude of the deformations to the combination of deformation fields depends on weights assigned to areas within the combination of deformation fields.

19. The computing device of claim 15, wherein the receiving the input includes receiving selection of a slider control and wherein the magnitude associated with the slider control is determined from a change in movement between a start point and an end point of the slider control.

20. The computing device of claim 19, wherein the display device is further configured to display, on the display device of the computing device, modal controls that, responsive to selection, cause deformations to one or more of eye height, eye size, eye width, eye tilt, upper lip, lower lip, mouth width, nose width, smile, face width, jaw shape, and chin length of the face in the image.

* * * * *